United States Patent

Wedekind et al.

Patent Number: 5,381,427
Date of Patent: Jan. 10, 1995

[54] SINGLE MODE LASER

[75] Inventors: Doerte Wedekind; Joerg Lawrenz-Stolz, both of Luebeck, Germany

[73] Assignee: Adlas GmbH & Co. KG, Luebeck, Germany

[21] Appl. No.: 39,040

[22] PCT Filed: Jul. 10, 1991

[86] PCT No.: PCT/EP91/01296
§ 371 Date: Apr. 6, 1993
§ 102(e) Date: Apr. 6, 1993

[87] PCT Pub. No.: WO92/07400
PCT Pub. Date: Apr. 30, 1992

[30] Foreign Application Priority Data
Oct. 11, 1990 [DE] Germany ............... 4032323

[51] Int. Cl.$^6$ ............................................. H01S 3/098
[52] U.S. Cl. .................................... 372/19; 372/20; 372/21; 372/69; 372/34; 372/71; 372/27; 372/105
[58] Field of Search .............. 372/105, 21, 22, 71, 372/69, 72, 70, 19, 20, 34, 36, 27

[56] References Cited

U.S. PATENT DOCUMENTS

| | | | |
|---|---|---|---|
| 4,617,666 | 10/1986 | Liu | 372/22 |
| 4,618,957 | 10/1986 | Liu | 372/22 |
| 4,809,291 | 2/1989 | Byer et al. | 372/34 |
| 5,249,190 | 9/1993 | Kortz et al. | 372/22 |

FOREIGN PATENT DOCUMENTS

| | | |
|---|---|---|
| 0331303 | 9/1989 | European Pat. Off. |
| 2431140 | 2/1980 | France . |
| 2222907 | 3/1990 | United Kingdom . |

OTHER PUBLICATIONS

Wolfgang Demtröder *Laser Spectroscopy Basic Concepts and Instrumentation*, Springer-Verlag Berlin Heidelberg New York 1982 pp. 178–365.

*Primary Examiner*—Georgia Y. Epps
*Attorney, Agent, or Firm*—Townsend and Townsend Khourie and Crew

[57] ABSTRACT

A diode-pumped solid state laser for single-mode operation contains a resonator with an input mirror and an output mirror between which an active laser medium, a polarizer and a birefringent crystal are disposed. The crystal is disposed with its optical axes in such a way that the latter form an angle of 45° to the polarizing direction produced by the polarizer. The losses for the ordinary and extraordinary rays are adjusted to be substantially equal. A temperature control means is used to keep the temperature of the birefringent crystal at a constant value so that the refractive indices and the length of the crystal do not change.

10 Claims, 2 Drawing Sheets

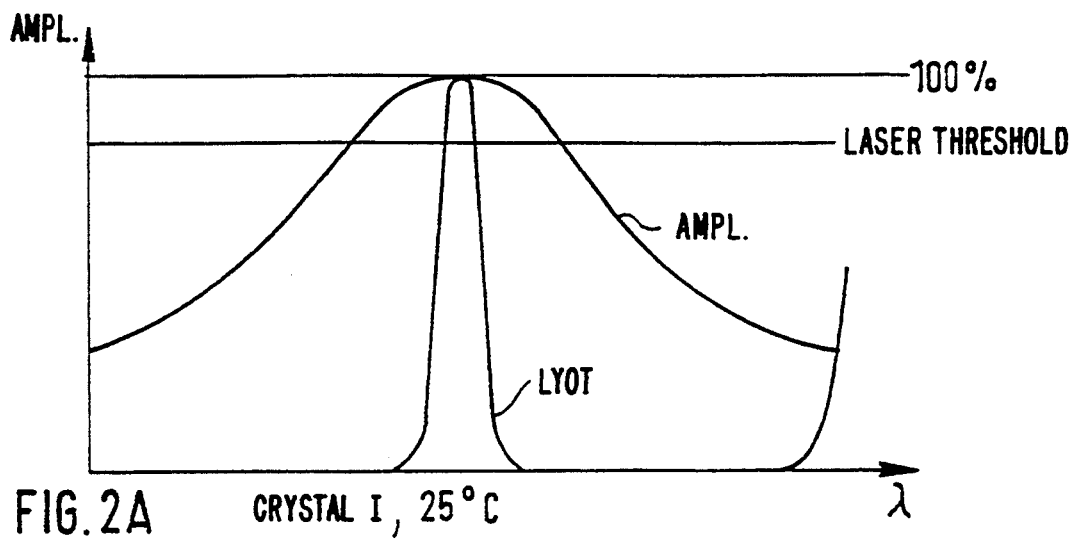
FIG. 2A  CRYSTAL I, 25°C
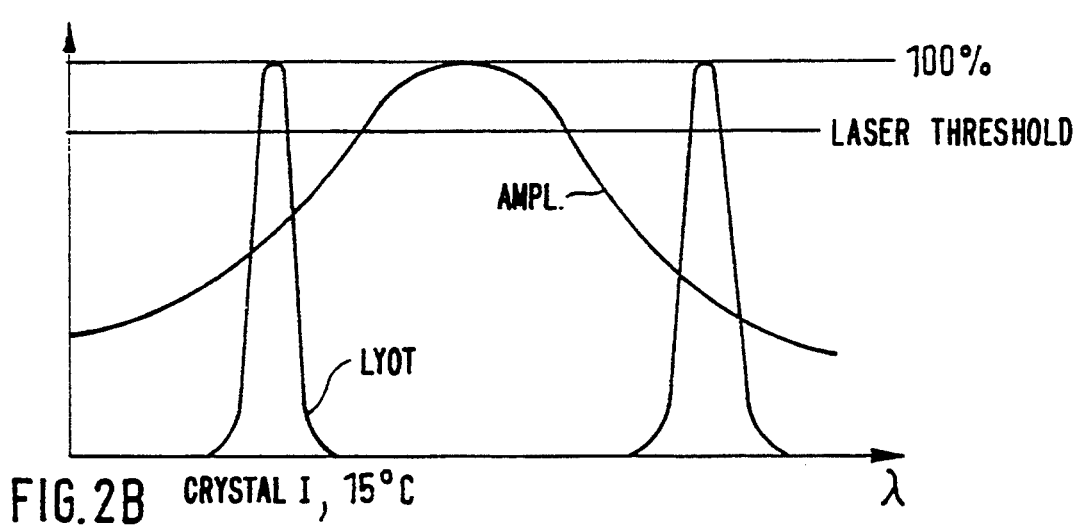
FIG. 2B  CRYSTAL I, 15°C
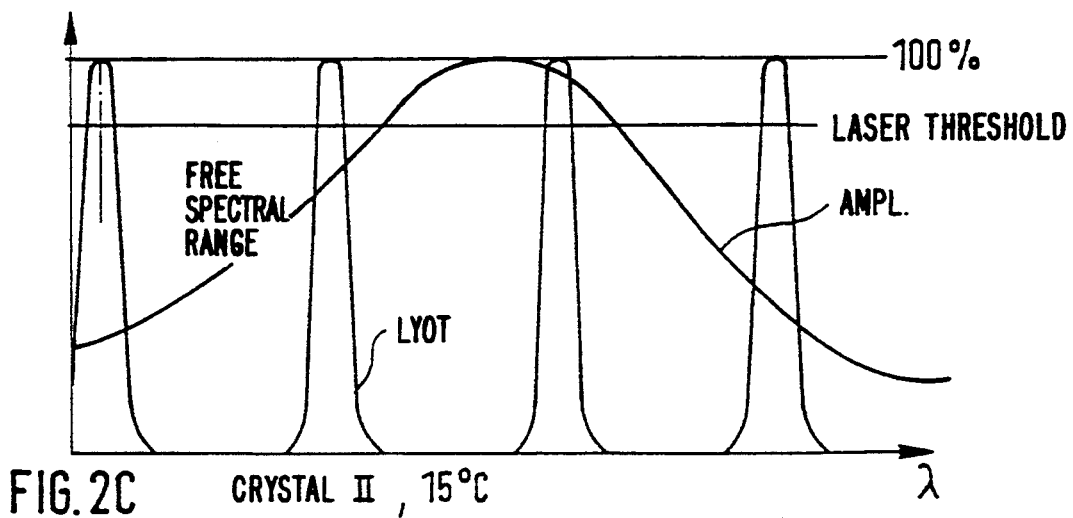
FIG. 2C  CRYSTAL II, 15°C

SINGLE MODE LASER

BACKGROUND OF THE INVENTION

The present invention relates to a single-mode laser, in particular in the form of a diode-pumped solid state laser, whereby this laser can also be used as a frequency-doubled laser, optionally for single-mode operation or multimode operation.

For a laser to have single-mode operation, i.e. operation involving only the basic transversal mode and a longitudinal mode in accordance with the wavelength of the active laser medium, the resonator must meet certain criteria. To limit the transversal modes to the basic mode one can use mode screens or adapt the volume of the pumped light to the volume of the basic mode of the resonator.

The invention is based on the problem of providing a laser characterized by particularly stable single-mode operation and designed as a frequency-doubled laser in a special embodiment, also in multimode operation.

SUMMARY OF THE INVENTION

This problem is solved by a single-mode laser, in particular in the form of a diode-pumped solid state laser, which has the following features:
 a pumped light source,
 a resonator having a first mirror,
 a laser medium,
 a polarizer,
 a crystal, and
 a second mirror serving as an output mirror.

Single-mode operation is possible if the crystal is disposed as a birefringent crystal with its optical axes at an angle of 45° to the polarizing direction produced by the polarizer, in such a way that the losses are substantially equal for the ordinary and extraordinary rays.

The birefringent crystal polarizes the light elliptically, and the polarizer permits the loss-free passage of only the light with the "right" polarizing direction.

This design of the resonator of the laser results in a Lyot filter. The laser light passes through the resonator repeatedly before leaving the resonator via the output mirror. Since the light thus passes repeatedly through the Lyot filter one obtains a very narrow-band filter so that single-mode operation of the laser is possible if the free spectral range of the resonator is large enough.

The Lyot filter formed by the inventive measures has transmission peaks that depend on the difference in refractive index of the crystal, the wavelength and the length of the crystal. The product of the difference in refractive index and crystal length must be adapted to the amplification curve of the laser wavelength. A 5-mm KTP crystal with an intersection angle of $\Theta \sim 26°$ typically provides a free spectral range of $\delta\nu = 3.2 \times 10_{11}$ Hz, which is clearly above the half-width value of the amplification curve of Nd-YAG of $\Delta\nu = 1.6 \times 10^{11}$ Hz.

The free spectral range of the Lyot filter must be larger than the half-width value of the amplification curve since two longitudinal modes can otherwise occur.

The invention ensures that no other losses occur for the extraordinary ray than for the ordinary ray. This is obtained e.g. by designing the second mirror as a plane mirror or as a mirror with a very large radius of curvature, the birefringent crystal being located between the polarizer formed as a Brewster window and the output mirror.

The pumped light is preferably adapted to the basic mode $TEM_{oo}$ with the aid of a lens.

As mentioned above, the refractive indices as well as the length of the crystal play a special part in single-mode operation in fixing the wavelength of the laser or the laser frequency. Since both the refractive indices and the length of the crystal are temperature-dependent, the exact laser frequency is dependent on the temperature of the crystal.

The invention accordingly provides for a temperature control means to keep the temperature of the resonator, in particular the crystal, at a constant value. A thermoelectric cooling means is preferably provided for keeping the temperature constant. If the temperature is kept constant within narrow limits both the refractive indices and the length of the crystal remain constant and stable single-mode operation is obtained. For single-mode operation of the laser one specially selects an output mirror whose degree of reflection is between 85% and 98%, striving to reduce the degree of reflection to obtain higher efficiencies. One can additionally design the crystal with its optical axes and dispose it within the resonator in such a way as to obtain a frequency-doubled laser. Although this frequency-doubled laser is preferably designed and used as a single-mode laser it can fundamentally also be used in multimode operation if green laser light is to be obtained for example. Independent protection is asserted for the design as a frequency-doubled laser, regardless of single-mode operation.

BRIEF DESCRIPTION OF THE DRAWINGS

An embodiment of the invention shall be explained with reference to the drawings, in which:

FIGS. 2A and 2B show the frequency response of a laser to illustrate the position of the Lyot filter in the spectrum at various crystal temperatures, and FIG. 2C shows the frequency response as in FIGS. 2A and 2B but for a crystal twice as long.

DETAILED DESCRIPTION OF SPECIFIC EMBODIMENTS

Figure 1:
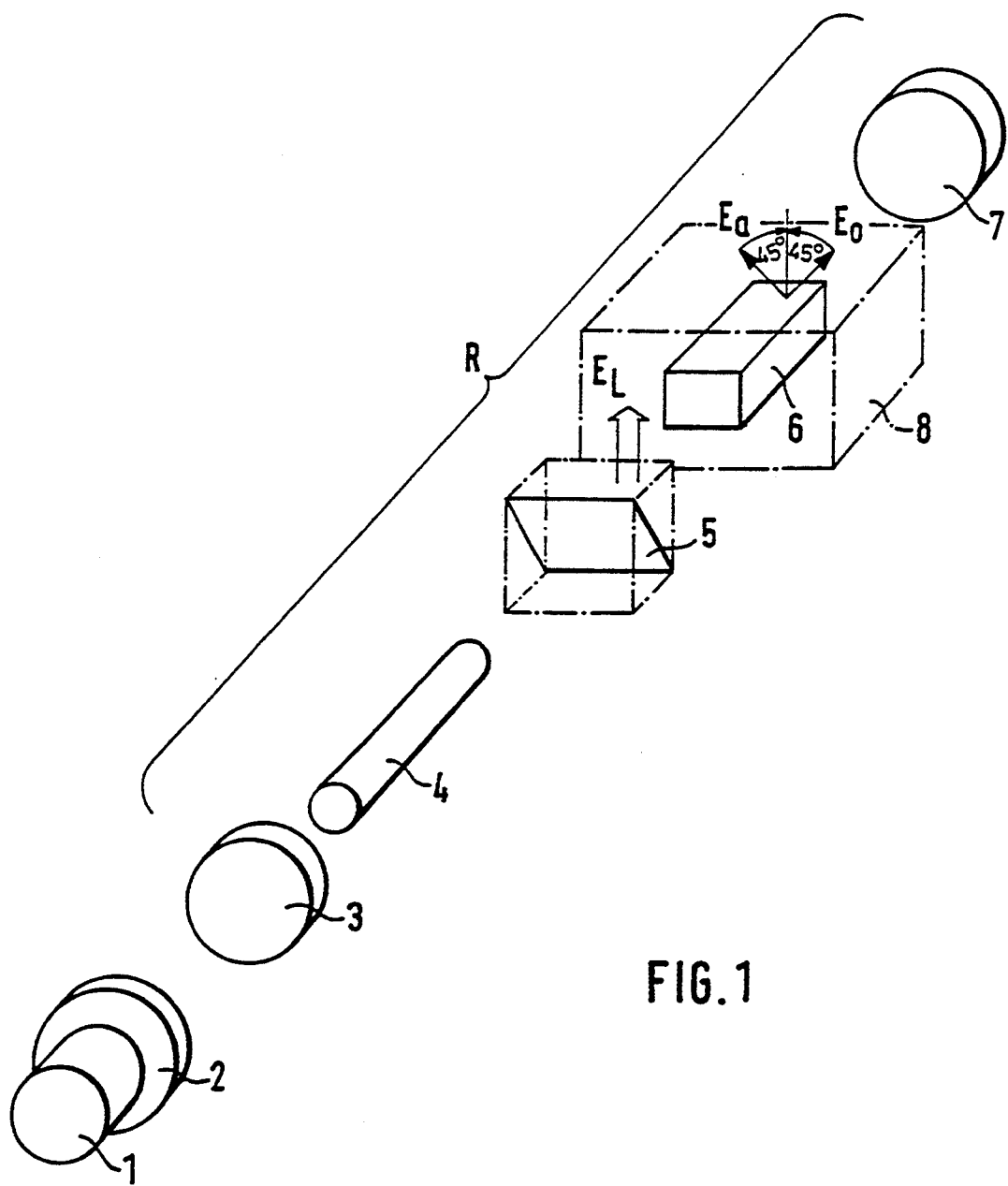
FIG. 1 shows a disassembled perspective view of a single-mode laser.

Before FIG. 1 and a special embodiment of the invention are dealt with, the marginal conditions for operating a single-mode laser shall be briefly described with reference to FIGS. 2A–2C.

FIG. 2A shows the amplification curve of a laser crystal and the position of the Lyot filter relative thereto. The temperature of crystal I of a certain length is 25° C. here. As one can see, the line width of the Lyot filter in the laser is very small. Above the laser threshold the amplification curve is relatively wide, and due to the relatively large free spectral range of the Lyot filter there is only one Lyot filter line within the amplification curve above the laser threshold.

FIG. 2A meets the requirements for single-mode operation:

a) the free spectral range of the Lyot filter is larger than the amplification curve above the laser threshold, and b) the line width of the Lyot filter is so small that only one longitudinal mode of the resonator is covered above the laser threshold.

While condition a) can be met by suitably selecting the length and refractive indices of the birefringent crystal, condition b) is met by a relatively short resonator having a large free spectral range. An example is the diode-pumped solid state laser.

As indicated by comparison of FIGS. 2A and 2B, by suitable temperature control of the crystal one can make the Lyot filter transmissive for modes which are above the laser threshold so that single-mode operation can occur if the abovementioned requirements are met.

Referring to FIG. 1, pumped light source 1 with a diode assembly emits pumped light through lens 2 onto the outside of input mirror 3. Lens 2 serves to adapt the pumped volume to the $TEM_{oo}$ volume of the resonator.

In the drawing this resonator is designated altogether as R. Its input mirror 3 has a reflecting surface with a relatively small radius of curvature on the side facing the interior of the resonator.

Behind the reflecting surface of input mirror 3 YAG element 4 is located as the active laser medium. It is followed by polarizer 5, which functions here as a polarizer and an analyzer at the same time. Then comes birefringent crystal 6. When the polarizing direction of the laser light is vertically oriented, as indicated in the drawing by vector $E_L$, the optical axes ($E_a$, $E_o$) for the extraordinary and ordinary rays each form an angle of 45° thereto.

Instead of using separate mirrors one can also provide them in the form of a special vapor deposition on the active medium and/or birefringent crystal. One can replace the separate polarizer by disposing the surfaces of the active medium and/or birefringent crystal pointing into the resonator at the Brewster angle.

At the lower end of resonator R one finds output mirror 7 whose reflecting surface facing crystal 6 has a degree of reflection of 95%.

For stable single-mode laser operation to be obtained, birefringent crystal 6 is provided with a temperature control means having thermoelectric cooling means 8 to ensure that the crystal has an adjustable constant temperature. This permits both the refractive indices and the length of the crystal always to be constant.

Crystal 6 can also be designed with its optical axes and disposed within the resonator in such a way that frequency doubling takes place. Such a frequency-doubled laser can in particular produce green laser light if neodymium in a known laser crystal or glass is used as the laser-active material (e.g. Nd:YAG, Nd:YLF, Nd:GGG, Nd:glass, etc.) and a fundamental wavelength of 1.0 to 1.1 μm is generated. Such a frequency-doubled laser can be designed as a single-mode laser, but the design as a multimode laser is preferable.

We claim:

1. A single-mode laser comprising:
   a pumped light source; and
   a resonator operatively coupled to the light source and having an optical axis, the resonator comprising:
   a laser medium disposed in series along the optical axis;
   a polarizer disposed is series along the optical axis and adapted to polarize light passing through the laser medium into a polarizing direction;
   a birefringent crystal disposed in series along the optical axis and adapted to split the light passing through the polarizer into an ordinary ray and an extraordinary ray, each ray having a polarization angle of 45 degrees to the polarizing direction, the crystal being configured so that the ordinary and extraordinary rays suffer substantially equal losses;
   a second mirror disposed in series along the optical axis and serving as an output mirror, the second mirror having a large radius of curvature; and
   a temperature controller, coupled to the resonator, adapted to maintain a temperature of the resonator constant.

2. The laser of claim 1 wherein the crystal has refractive indices and a length, the temperature control means stabilizing the temperature of the resonator so that the refractive indices and the length of the crystal remain within narrow limits.

3. The laser of claim 1 wherein the second mirror is a plane mirror.

4. The laser of claim 1 wherein the polarizer has an optical surface at the Brewster angle with respect to the optical axis.

5. The laser of claim 1 further comprising a lens coupled to the light source for adapting a volume of the light source to a volume of the basic mode of the resonator.

6. The laser of claim 1 wherein the temperature control means includes a thermoelectric cooler.

7. The laser of claim 1 wherein the second mirror has a degree of reflection between 85% and 98%.

8. A single-mode laser comprising:
   a pumped light source; and
   a resonator operatively coupled to the light source and having an optical axis, the resonator comprising:
   a laser medium disposed in series along the optical axis;
   a polarizer disposed in series along the optical axis and adapted to polarize light passing through the laser medium into a polarizing direction;
   a birefringent crystal disposed in series along the optical axis and adapted to split the light passing through the polarizer into an ordinary ray and an extraordinary ray, each ray having a polarization angle of 45 degrees to the polarizing direction, the crystal being configured so that the ordinary and extraordinary ray suffer substantially equal losses and so that a frequency of the light is doubled as the light passes through the crystal;
   a second mirror disposed in series along the optical axis and serving as an output mirror; and
   a temperature controller, coupled to the resonator, adapted to maintain a temperature of the resonator constant.

9. A single-mode laser comprising:
   a pumped light source; and
   a resonator operatively coupled to the light source and having an optical axis, the resonator comprising:
   a laser medium disposed in series along the optical axis;
   a polarizer disposed in series along the optical axis and adapted to polarize light passing through the laser medium into a polarizing direction;
   a birefringent crystal disposed in series along the optical axis and adapted to split the light passing through the polarizer into an ordinary ray and an extraordinary ray, each ray having a polarization angle of 45 degrees to the polarizing direction, the crystal constructed and arranged to form a Lyot filter so that a narrow-band of frequencies pass through the crystal; and a second mirror disposed in series along the optical axis after the crystal, the second mirror having a large radius of curvature so that the ordinary and extraordinary rays suffer substantially equal losses.

10. A method for operating a single-mode laser comprising the steps of:

generating a beam of light;

directing the beam into a laser medium disposed in an optical resonator;

polarizing the beam into a polarizing direction;

splitting the beam into an ordinary ray and an extraordinary ray with a birefringent crystal so that each ray has a polarization angle of 45 degrees to the polarizing direction and each ray suffers substantially equal losses passing through the crystal, the crystal having refractive indices and a length;

filtering the beam with a Lyot filter so that a narrow range of frequencies passes through the resonator; and maintaining the temperature of the resonator constant to stabilize the length and the refractive indices of the crystal.

* * * * *